United States Patent [19]

Harvey

[11] Patent Number: 4,616,791
[45] Date of Patent: Oct. 14, 1986

[54] IRRIGATION OR OTHER MACHINE HAVING A ROTATABLE DRUM CARRYING A HOSE OR OTHER FLEXIBLE ELEMENT WOUND THEREON

[76] Inventor: Vernon B. W. Harvey, Tanglewood, Stour Close, Little Canford, Wimborne, Dorset, Great Britain

[21] Appl. No.: 713,792

[22] Filed: Feb. 20, 1985

[30] Foreign Application Priority Data

Mar. 31, 1984 [GB] United Kingdom ............... 8408371
Nov. 28, 1984 [GB] United Kingdom ............... 8429988

[51] Int. Cl.$^4$ .................. B65H 75/40; B65H 75/34
[52] U.S. Cl. .................. 242/86.2; 242/86.5 R; 242/86.8; 242/158 R; 242/158.2
[58] Field of Search ............... 242/86.2, 86.3, 86.5 R, 242/86.51, 86.8, 158 R, 158.2, 158.3

[56] References Cited

U.S. PATENT DOCUMENTS

| | | | |
|---|---|---|---|
| 2,573,868 | 11/1951 | Newell | 242/86.2 X |
| 3,031,153 | 4/1962 | Attwood et al. | 242/158 R |
| 3,118,627 | 1/1964 | Nelson et al. | 242/158.2 X |
| 3,715,084 | 2/1973 | Weiss, Jr. | 242/158.2 X |
| 3,739,982 | 6/1973 | Perrot et al. | 242/86.8 X |
| 4,265,414 | 5/1981 | Spradling | 242/86.2 |
| 4,306,682 | 12/1981 | Toussaint | 242/86.2 X |
| 4,513,772 | 4/1985 | Fisher | 242/86.2 X |

Primary Examiner—John Petrakes
Attorney, Agent, or Firm—Gifford, Groh, VanOphem, Sheridan, Sprinkle & Dolgorukov

[57] ABSTRACT

A hose-drum irrigation machine including a hose-laying device by which a hose-guide through which the hose passes is reciprocated parallel to the axis of rotation of the hose-drum as the drum is rotated. The hose-laying device includes a carriage to which the reciprocation is applied and the hose-guide is mounted for movement relative to the carriage parallel to the axis of rotation of the drum between two extreme positions adjacent the ends of the carriage. The hose-laying device includes control means responsive to the position of the hose-guide in the length of the carriage to control a motor driving the drum. One of the extreme positions of the hose-guide on the carriage corresponds to maximum permitted drum speed and the other of the extreme positions corresponds to zero or minimum drum speed.

9 Claims, 9 Drawing Figures

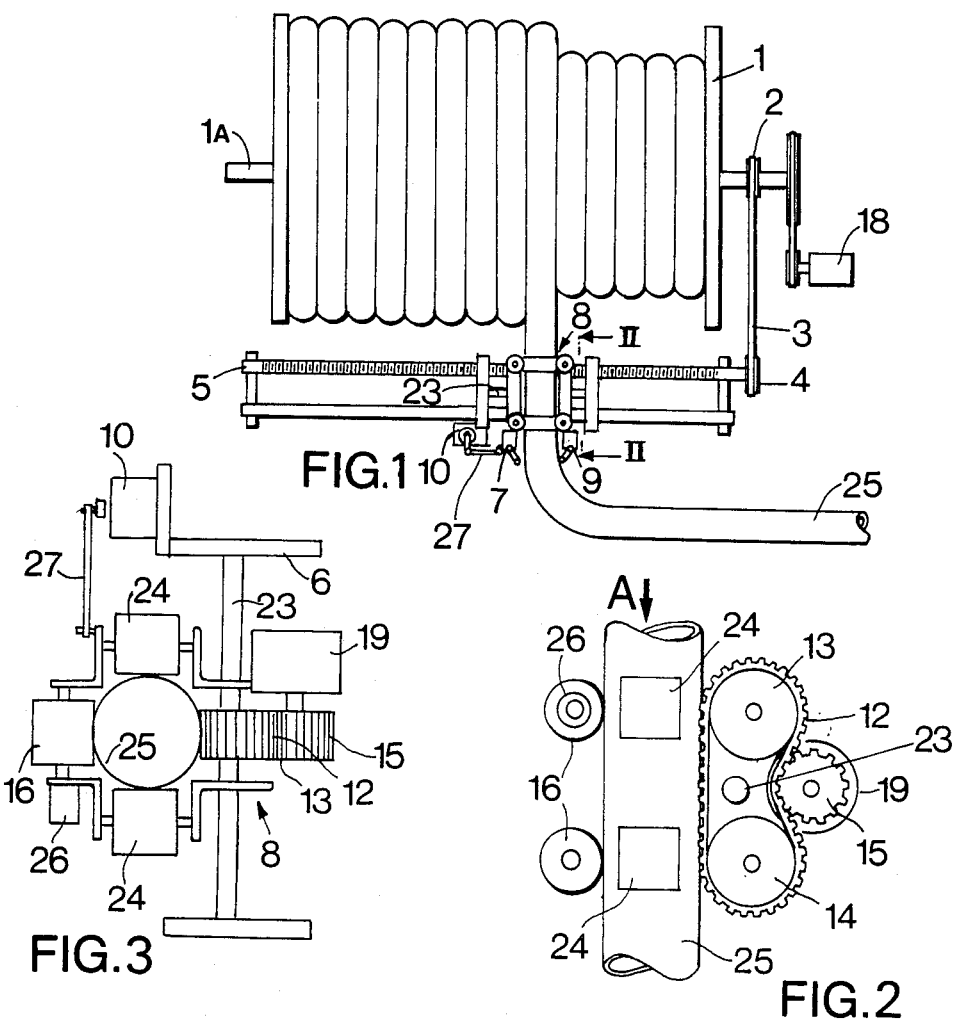
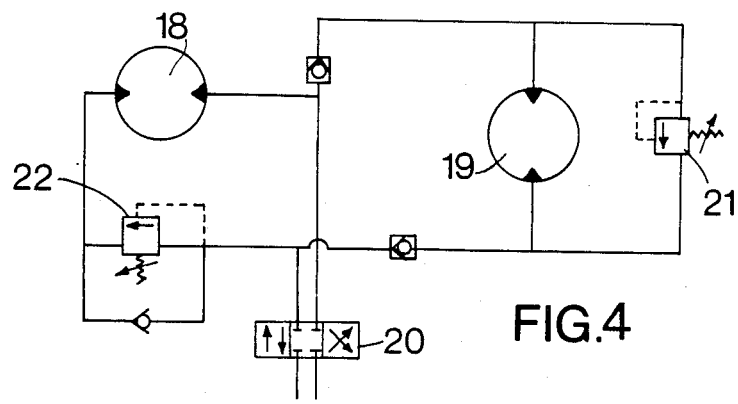

IRRIGATION OR OTHER MACHINE HAVING A ROTATABLE DRUM CARRYING A HOSE OR OTHER FLEXIBLE ELEMENT WOUND THEREON

The invention relates to a machine to be driven or otherwise propelled along the ground and carrying a rotatable drum, reel or other like carrier (hereinafter called a drum) on which a hose, cable, wire or like flexible element is wound in a plurality of side-by-side convolutions in at least one layer and from which the hose or other said flexible element can be unwound therefrom and rewound thereon.

FIELD OF THE INVENTION

The invention is particularly, but not exclusively, concerned with a hose-drum irrigation machine of the kind having a rotatably driven drum carrying a hose wound thereon in a plurality of side-by-side convolutions, in at least one layer and communicating at one end with a source of water or other liquid to be discharged through the hose while wound or partly wound on the drum and at the other end with an irrigation gun, sprinkler or other liquid discharging device.

DESCRIPTION OF THE PRIOR ART

In known hose-drum irrigation machines of this kind, the hose is wound on the drum in side-by-side convolutions in at least one layer and is unwound therefrom by a hose-laying device comprising a lead-screw driven in synchronism with the drum and having forward and reverse threads thereon and extending parallel to the axis of rotation of the hose-drum and a nut engaging the threads of the lead-screw and carrying a guide through which the hose passes, or an equivalent mechanism to provide reciprocating travel of the hose-guide, whereby as the drum is rotated, the hose-guide will be reciprocated parallel to the axis of rotation of the drum and thereby the convolutions of the hose on the drum in one or more layers will be formed thereon or removed therefrom.

Such a hose-laying device suffers from the disadvantage that it does not compensate for the change in effective drum diameter as the layers are formed or removed and so various proposals have previously been made in an attempt to compensate for this change in effective drum diameter by varying the ratio of the gear or other drive between the drum-driving shaft and the lead-screw. An object of the invention is to provide a simple means whereby instead of varying the gear ratio between the drum-driving shaft and the lead-screw, the speed of rotation of the drum and the speed of the machine along the ground are maintained substantially equal, thereby to maintain the convolutions of the hose tight on the drum during travel of the machine despite change in effective diameter of the drum as the number of layers of convolutions are formed or removed or the speed of rotation of the drum or the ground speed of the machine are varied.

Another object of the invention is to provide a tensioning device acting on the hose as it is unwound from or re-wound on the drum.

Although the foregoing objects are directed to a hose-drum irrigation machine, they may also be applied to any other machine to be driven along the ground and having a driven drum on which another flexible element, such as a cable or wire, is wound in a plurality of side-by-side convolutions in one or more layers.

SUMMARY OF THE INVENTION

According to the invention, an irrigation or other machine which is to be driven or otherwise propelled along the ground and which carries a drum, as hereinbefore defined, having a hose or other flexible element wound thereon in a plurality of side-by-side convolutions in at least one layer, includes a hose-laying device by which a hose-guide through which the hose or other element passes is reciprocated parallel to the axis of rotation of the drum as the drum is rotated, the hose-laying device including a carriage to which the reciprocation is applied, the hose-guide being mounted for movement relative to the carriage for movement in directions parallel to the axis of rotation of the drum between two extreme positions, in one of which the hose-guide is nearer to one end of the carriage and in the other of which the hose-guide is nearer to the other end of the carriage, the hose-laying device also including means responsive to the position of the hose-guide in the length of the carriage to control a motor driving the drum or a motor driving the machine along the ground, one of said extreme positions of the hose-guide on the carriage corresponding to maximum permitted drum rotational speed and the other of said extreme positions of the hose-guide on the carriage corresponding to zero or minimum drum rotational speed.

The hose-guide may be supported on a link mechanism mounted on the carriage and providing the aforesaid movement of the hose-guide relative to the carriage or it may be mounted to slide along a lay-shaft extending parallel to the axis of the drum and mounted on the carriage.

Where the hose-guide is supported on a linkage, the linkage may also provide an axis of swivelling of the hose-guide transversely of the longitudinal axis of the portion of the hose or other element as it passes through the hose-guide, whereby the hoseguide together with said portion of the hose or other element is able to tip to accommodate change in the inclination of said portion of the hose or other element due to the number of layers of convolutions of the hose or other element present at any instant on the drum and therefore the effective diameter of the layer or outermost layer thereon.

The hose-laying device may comprise a lead-screw having forward and reverse threads thereon, the lead-screw being mounted parallel to the axis of rotation of the drum and arranged to be driven in synchronism with means for driving the drum; the carriage having mounting means including a nut or other screw-threaded element in engagement with one or other of the threads of the lead screw.

The machine may also include a tensioning device engaging the outer surface of the hose or other flexible element at a position adjacent the hose-guide, the tensioning device including driving means therefor operable to pull or to exert a drag on the hose or other flexible element as it is being unwound or re-wound and thereby to maintain the hose or other flexible element in tension and thereby to prevent the convolutions on the drum from becoming loose with respect to the drum periphery.

The driving means in the tensioning device may be a hydraulic or other fluid-operable motor or an electric motor. The drum and the lead-screw or equivalent device may also have driving means comprising a hydraulic or other fluid-operable motor or an electric motor. Where the driving means in the tensioning device and the drum driving means are both hydraulic or other fluid-operable motors they may be connected in a circuit including adjustable valve means, whereby the tensioning device motor creates a back-pressure on the drum driving motor, thereby to ensure that the latter cannot be operated until the back-pressure has been produced by the operation of the motor of the tensioning device.

The circuit may also include a valve acting across the motor of the tensioning device which is adjustable to produce a predetermined resistance when said motor is driven by the tensioning device when the drum is being driven in the hose-winding direction.

The machine may also include switch means positioned adjacent the hose or other flexible element as it approaches the hose-guide on being re-wound or leaves the hose-guide on being unwound, whereby deviation of the hose or other flexible element from a normal position as a result of a difference between the linear velocity of the hose or other flexible element and the ground speed of the machine will stop the machine and drum-driving motors.

BRIEF DESCRIPTION OF THE DRAWINGS

Several embodiments of a hose winding and unwinding device for a hose drum irrigation machine as hereinbefore defined are now described by way of example with reference to the accompanying drawings, in which:

FIG. 1 is a side elevation of the hose drum and a hose-laying mechanism incorporating the first embodiment of the hose winding and unwinding device;

FIG. 2 is a detail view of the line II—II in FIG. 1 of part of the device shown in FIG. 1;

FIG. 3 is a view in the direction of arrow A in FIG. 2;

FIG. 4 is a fluid control circuit including two motors also shown in FIGS. 1–3;

Referring first to FIG. 1, the hose-drum is mounted for rotation on a shaft IA substantially parallel to the ground and to the longitudinal center line of a chassis, not shown, on which the hose-drum is mounted, that is the axis of rotation of the shaft extends in the direction of travel of the chassis. The shaft IA is driven through reduction gearing from a hydraulic or other fluid motor 18. The hose 25 is wound on the drum in one or more layers of side-by-side convolutions by means of a hose-laying mechanism comprising a hose-guide 8 mounted on a carriage 6 which travels along a reversed threaded lead-screw 5, first in one direction and then in the opposite direction. The lead-screw 5 is driven by a chain-and-sprocket drive 3, 4 from a chain-driving sprocket 2 mounted on the shaft IA. Thus rotation of the hose drum in the winding or unwinding direction by the motor 18 also moves the hose-guide 8 in one direction or the other along the lead-screw 5 and so the hose 25 is wound on or is unwound from the drum 1 progressively along the axial length of the drum in one or more layers. Such a mechanism is known in hose-drum irrigation machines. In FIG. 1 the hose 25 is connected at one end thereof remote from the machine to a fixed hydrant (not shown) and supplies through the convolutions on the drum and the shaft IA which is hollow, an irrigation gun or boom, not shown, mounted on the machine.

Figure 5:
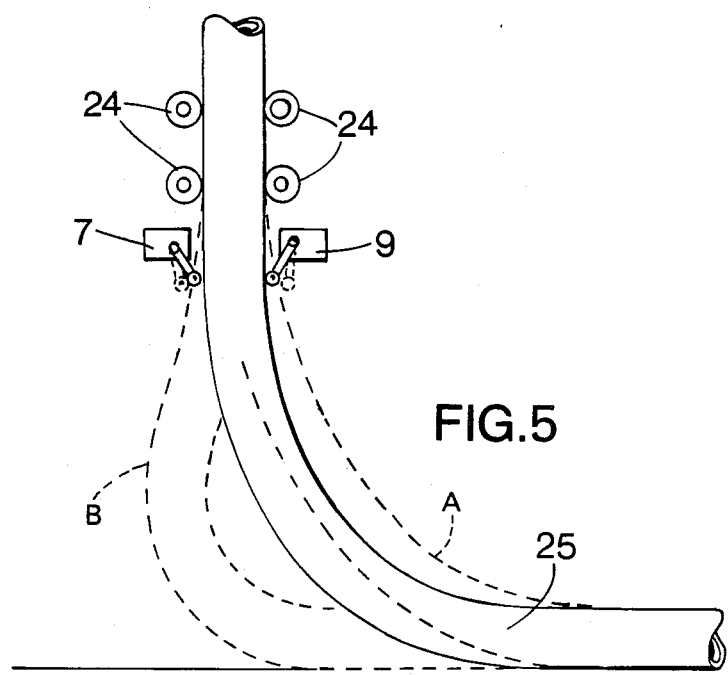
FIG. 5 is a diagram showing a pair of switches also shown in FIG. 1 for controlling the motors shown in FIG. 4 in response to deviation of a portion of the hose beneath the device as shown in FIG. 1 from a normal position during its winding or unwinding as a result of a difference in linear speed of the hose and the ground speed of the machine.

The hose winding and unwinding device illustrated in FIGS. 1–3 has as an object the matching of the linear speed of the hose as it is wound on or unwound from the hose drum 1 to the speed of the machine along the ground and also compensates automatically for changes in effective drum diameter as the hose layers thereon are formed or are reduced.

In previously known hose-drum machines, the hose-guide is in the form of a nut which travels along the lead-screw 5 and through which the hose is guided and travels with the nut in the axial direction of the lead-screw 5. The hose-guide 8 illustrated in FIGS. 1–3, however, is not directly engaged with the lead-screw 5 but is mounted on a lay-shaft 23 carried in end-supports forming part of the carriage 6 which is mounted on the lead-screw 5 One or both the end-supports are engaged by the screw-thread of the lead-screw 5 and so the lay-shaft 23 travels bodily along the lead-screw 5. The lay-shaft 23 extends parallel to the axes of rotation of the drum 1 and the lead-screw 5. The hose-guide 8 is freely slidable along the lay-shaft 23. The hose-guide 8 comprises two pairs of guide rollers 24 engaging against the outside of the hose 25 at diametrically-opposite positions. Across the diameter at 90° to the rollers 24, the hose is guided between a pair of guide rollers 16 and an endless friction belt 12 supported on pulleys 13 and 14 all carried in an assembly slidable along the lay-shaft 23. The belt 12 has external teeth thereon which are drivingly-engaged by a toothed driving pulley 15 driven by a motor 19. The hose-guide assembly 8 is connected by a lever 27 to a sensing device 10 carried on the carriage 6. The sensing device 10 may be any kind of transducer which will transmit signals dependent on the position of the hose-guide assembly 8 on the lay-shaft 23 to control the speed of the motor 18 which drives the drum 1 and the lead-screw 5. Alternatively, the sensing device 10 may be used to control a motor, not shown, for driving the machine along the ground. The hose-speed may be monitored by comparing the signal from the sensing device 10 with a hose-speed signal determined by a speed sensor 26 driven by one of the hose-engaging rollers 16 or 24. The sensing device 10 is so adjusted that when the hose-guide assembly 8 is adjacent one end of the lay-shaft 23 the drum is driven at maximum speed and when the hose-guide assembly 8 is adjacent the opposite end of the lay-shaft 23, the drum speed is zero, i.e., the drum is not rotating. At some position of the hose-guide assembly 8 intermediate the ends of the lay-shaft 23, the sensing device 10 will have set the drum-driving motor 18 to a speed equal to the ground speed. In the alternative arrangement, the machine motor (not shown) will have been set to a speed equal to the drum speed. The motor 18 and the machine-driving motor (not shown) may be fluid operable, e.g., they may be hydraulic motors. Alternatively the motors may be electric motors. In this way, the drum speed and the ground speed of the machine can be maintained substantially equal, thereby to permit the hose 25 to be wound onto or to be unwound from the drum at the correct tension despite change in effective drum diameter as the layers of hose 25 are formed or reduced and so the hose convolutions will normally tend to be held tight around the drum 1.

Figure 6:
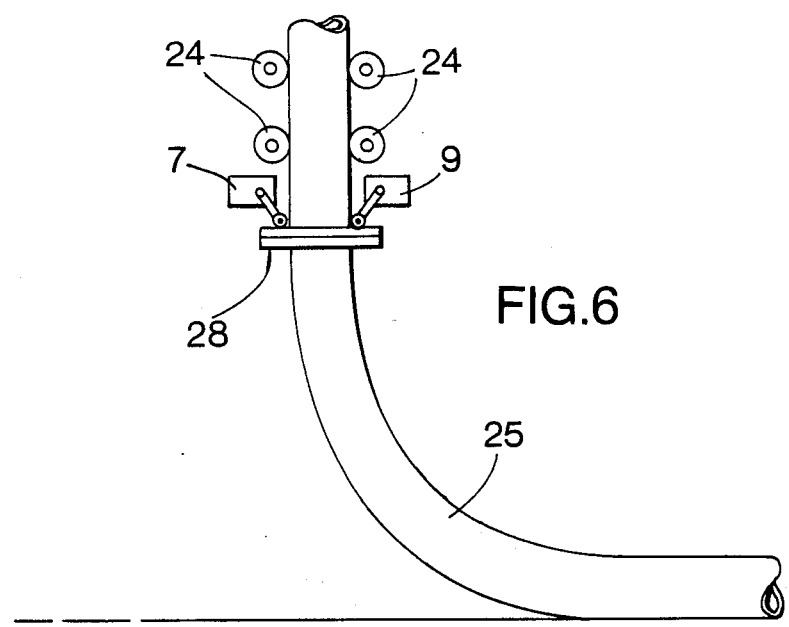
FIG. 6 is a diagram showing the use of the pair of switches shown in FIG. 1 to reverse the direction of rotation of the hose drum.

The hose guide assembly 8 also carries a pair of switches 7 and 9 mounted one at each side of the hose 25 as shown in FIGS. 1, 5 and 6 and having operating members engageable with the hose at a pair of diametrically-opposite positions thereon. The switches 7 and 9 which are fluid-operable or electrical operate to stop both the machine-driving and the hose-driving motors when one or other is engaged by the hose as a result of deviation of the hose in the vicinity of the switches 7 and 9 from a normal position occupied by that part of the hose when the drum speed and ground speed are equal. The normal position of the hose 25 is indicated in FIG. 5 by full lines and in that condition neither switch 7 and 9 is engaged by the hose 25. When the ground speed of the machine is the datum and the drum fails to match the required speed or ceases to rotate, continuing travel of the machine will attempt to drag the hose along the ground and the hose will deviate to a position such as position A on one side or the other of the normal position, according to the direction of travel of the machine. Thus the appropriate switch 7 or 9 will shut down both the drum-driving motor and machine-driving motor (not shown). If the machine should stop while the drum continues to be driven, the hose will take up the position indicated at B in FIG. 5, at one side or the other, and so the switch 7 or 9, as appropriate, is operated to stop both the drum-driving and machine-driving motors. Where the drum speed is the speed datum and the ground speed of the machine fails to equal the drum speed, any deviation of the hose from its normal position to the position shown at A or B in FIG. 5 will effect operation of the appropriate switch 7 or 9, thereby shutting down the machine. The switches 7 and 9 therefore act as fail-safe devices which will over-ride the control effected by the hose guide assembly 8 which is freely-movable on the lay-shaft 23 and which will therefore protect the hose from damage during a machine malfunction.

The switches 7 and 9 may also be operated simultaneously to effect reversal of the hose-drum and machine-driving motors when the hose 25 has been fully re-wound onto the drum 1, by providing on the hose adjacent the hydrant a shoulder 28 which may be a pair of connecting flanges between the hose and the hydrant, engageable with the switches 7 and 9, as shown in FIG. 6.

Another feature of the hose-winding and unwinding device is the endless friction belt 12 which is driven by the motor 19 and which engages the hose 25 at a position diametrically-opposite the rollers 16. This is provided to pull the hose from the drum 1 in the hose-unwinding sense, thereby to ensure that the convolutions remain tight on the drum. Where the drum-driving motor 18 and the belt-driving motor 19 are hydraulic or are other fluid-operable motors, they are connected in a fluid circuit shown in FIG. 4. The circuit includes an adjustable valve 22.

This is set to apply a back pressure created by the motor 19 on the motor 18. The motor 18 cannot function until it has been subjected to this back pressure and so ensures that the hose 25 is pulled from the drum 1 and the convolutions of the hose on the drum are maintained tight. The circuit also includes an adjustable valve 21 which is set to create a predetermined resistance when the motor 19 is driven by the endless belt 12 as a result of winding the hose 25 onto the drum 1 when the latter is driven in the winding direction by the motor 18. In this way a drag is imparted to the hose and the hose is maintained taut during re-winding. The grip on the hose 25 between the rollers 16 and the belt 12 is adjustable by making the rollers 16 adjustable towards and away from the pulleys 13 and 14. Instead of using the endless belt 12, the tension in the hose 25 can be produced by an equivalent roller or rollers arranged to grip the hose together with the rollers 16 and arranged to be driven by the motor 19. A proportional control valve 20 reverses the direction of rotation of the motors 18, 19.

The hose tensioning device comprising the endless belt 12, the pulleys 13, 14 and 15 and the motor 19, or equivalent motor driven rollers, may be optional, that is, the hose-guide assembly 8 which is freely slidable on the lay-shaft 23 may be used with or without the hose tensioning device, the latter being replaced by hose-guiding rollers engaging the hose diametrically-opposite the rollers 16.

Figure 7:
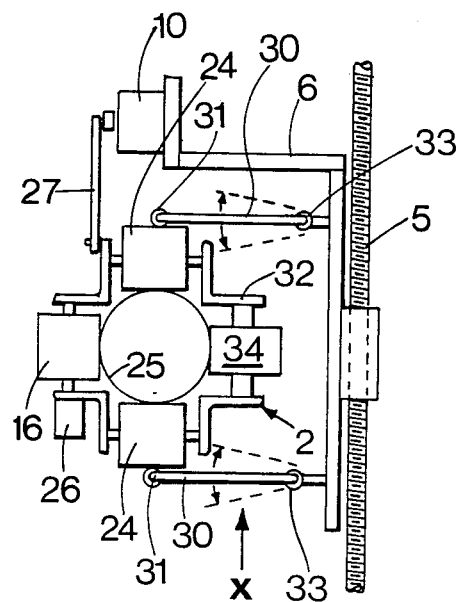
FIG. 7 is a view of the second embodiment and similar to FIG. 3.
Figure 8:
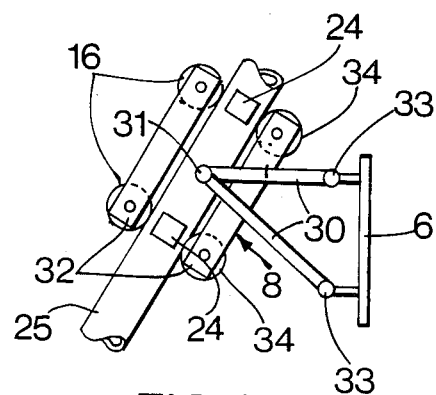
FIG. 8 is a detail diagrammatic view in the direction of arrow X in FIG. 7 to a smaller scale and showing a modification enabling the whole hose-guide and a portion of hose therein to pivot about an axis transverse to the longitudinal axis of the hose portion.
Figure 9:
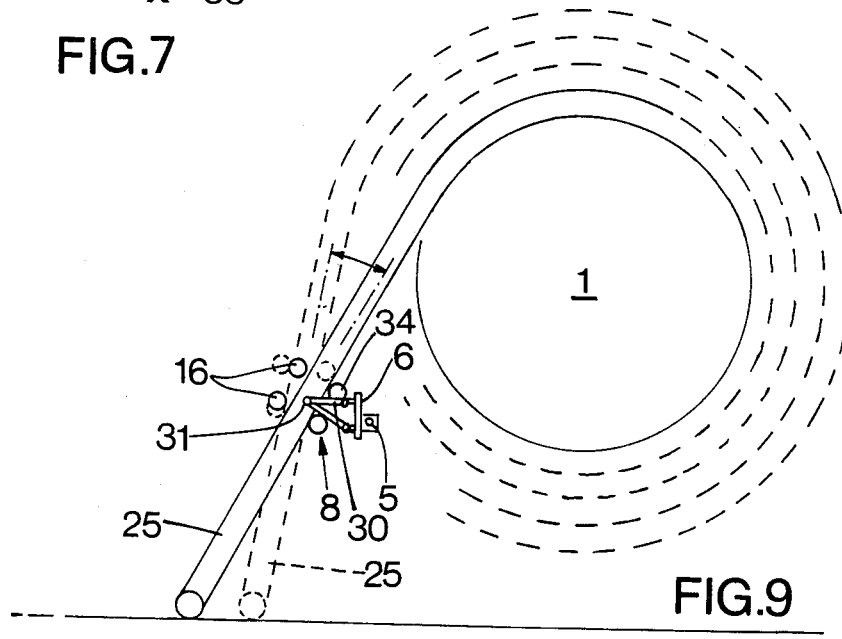
FIG. 9 is a diagram illustrating the operation of the pivotally-mounted hose-guide shown in FIG. 8.

Instead of the hose-guide assembly 8 being mounted for sliding along the lay-shaft 23, the hose-guide assembly 8 may be mounted as shown in FIG. 7 on frames of links 30 which are pivotally-mounted at 33 on the carriage 6 and which support at pivots 31 at their other ends a frame 32 on which the rollers 16, 24 and the pulleys of the endless belt 12, where provided, are mounted. The frames of links 30 are shown in FIGS. 7-9, although the pivots 31 are only indicated diagrammatically. The links 30 permit the whole hose-guide assembly 8 to swing freely from one end of the carriage 6 to the other, whereby matching of the speed of the drum-driving motor 18 to the ground speed, or the speed of a motor driving the machine, by means of the lever 27 and the sensing device 10 is effected, similarly to the embodiment shown in FIGS. 1-3.

As for the embodiment shown in FIGS. 1-3, the hose-tensioning device comprising the endless belt 12 is optional and where it is not provided, the endless belt 12 and its supporting pulleys would be replaced by rollers 34, as shown in FIG. 7, mounted on the frame 32 diametrically opposite the rollers 16, with respect to the hose 25.

The whole hose-guide assembly 8 may also be pivotally mounted for free swivelling at pivots 31 about an axis transverse to the longitudinal axis of the hose 25, as shown in FIG. 8. As will be seen the links 30 form a braced structure to support the hose-guide assembly 8 and the hose 25 from swinging in the plane of FIG. 8 about the pivots 33. By providing the axis of swivelling at 31, variation in the angle of inclination of the portion of the hose 25 passing through the hose-guide assembly 8 can be accommodated, thereby to enable the portion of the hose 25 to extend substantially tangentially to the convolutions of hose on the hose-drum as it is wound on or off each layer of convolutions. FIG. 9 illustrates in full lines the angle of inclination of the portion of the hose 25 passing through the hose-guide assembly 8 and the corresponding position of the hose-guide assembly 8 when the hose 25 is being wound onto or unwound from the innermost layer of convolutions on the hose-drum 1 and in broken lines the corresponding angle of inclination of the hose 25 and position of the hose-guide assembly 8 when the hose 25 is being wound onto or unwound from the outermost layer of convolutions on the hose-drum 1, where three layers of convolutions of hose 25 are to be accommodated. With the arrangement shown in FIGS. 8 and 9, the switches 7 and 9 may still be employed and these could operate as described herein with reference to FIGS. 5 and 6.

Although the hose-laying device in the embodiment illustrated comprises a lead-screw and nut, an equivalent mechanism to provide reciprocating travel of the carriage 6 as the drum is rotated may be employed.

Although the invention has been applied to a hose-drum irrigation machine it may alternatively be applied to a similar driven machine having a cable- or wire-winding drum thereon.

What I claim as my invention and desire to secure by Letters Patent of the United States is:

1. An irrigation or other machine which is to be driven or otherwise propelled along the ground including a drum, having a flexible element, such as a hose, wound thereon in a plurality of side-by-side convolutions in at least one layer; a drum-driving motor operable in both the winding on and winding off directions, and a hose-laying device by which a hose-guide through which the hose or other element passes tangentially with respect to an upper part of a convolution of said flexible element is reciprocated parallel to the axis of rotation of the drum as the drum is rotated in either direction, said hose-laying device comprising said hose-guide and a carriage to which said reciprocation is applied, said hose-guide mounted for movement relatively to said carriage for movement in directions parallel to the axis of rotation of the drum between two extreme positions, in one of which said hose-guide is nearer to one end of said carriage and in the other of which said hose-guide is nearer to the other end of said carriage, said hose-laying device also including means responsive to the position of said hose-guide in the length of said carriage to control one of (a) the rotational speed of said drum-driving motor or (b) the ground speed of said machine, whereby to maintain the linear velocity of said flexible element and the ground speed of machine substantially equal to each other, one of said extreme positions of the hose-guide on the carriage corresponding to maximum permitted drum rotational speed and the other of said extreme positions of the hose-guide on the carriage corresponding to minimum drum rotational speed.

2. A machine as claimed in claim 1 in which said hose-guide is supported on a link mechanism mounted on said carriage and providing the aforesaid movement of said hose guide relative to the carriage.

3. A machine as claimed in claim 1 in which said hose-laying device includes a lay-shaft extending parallel to the axis of said drum and mounted on said carriage and along which said hose-guide is slidable.

4. A machine as claimed in claim 2 in which said link mechanism also provides an axis of swivelling of said hose-guide transversely of the longitudinal axis of a portion of said flexible element as it passes through said hose-guide, whereby said hose-guide together with said portion of said flexible element is able to tip to accommodate change in the inclination of said portion of said flexible element due to the number of layers of convolutions of said flexible element present at any instant on said drum and therefore the effective diameter of the outer layer thereon.

5. A machine as claimed in claim 1 in which said hose-laying device comprises a lead-screw having forward and reverse threads thereon, said lead-screw being mounted parallel to the axis of rotation of said drum and arranged to be driven in synchronism with said drum-driving motor; said carriage having mounting means including a screw-thread element in engagement with a thread of said lead screw.

6. A machine as claimed in claim 1 including a tensioning device engaging the outer surface of said flexible element at a position adjacent said hose-guide, said tensioning device including driving means therefor operable on said flexible element as said drum is rotating, thereby to maintain said flexible element in tension and thereby to prevent the convolutions on said drum from becoming loose on said drum.

7. A machine as claimed in claim 6 in which said drum-driving motor and said driving means for said tensioning device are both fluid-operable motors, said motors connected in a circuit including adjustable valve means, whereby said tensioning device motor creates a back-pressure on said drum-driving motor, thereby to ensure that the latter cannot be operated until the back-pressure has been produced by the operation of said tensioning device motor.

8. A machine as claimed in claim 7 in which said circuit includes a valve acting across said tensioning device motor and which is adjustable to produce a predetermined resistance when said tensioning device motor is driven by said tensioning device when said drum is being driven in the winding direction.

9. A machine as claimed in claim 1 including switch means positioned adjacent said flexible element as it approaches said hose-guide, whereby deviation of said flexible element from a normal position as a result of a difference between the linear velocity of said flexible element and the ground speed of said machine will stop both said drum-driving motor and said machine.

* * * * *